United States Patent
Foster et al.

(10) Patent No.: US 6,701,397 B1
(45) Date of Patent: Mar. 2, 2004

(54) PRE-ARBITRATION REQUEST LIMITER FOR AN INTEGRATED MULTI-MASTER BUS SYSTEM

(75) Inventors: Eric M. Foster, Owego, NY (US); Steven B. Herndon, Endwell, NY (US); Eric E. Retter, Warren Center, PA (US); Ronald S. Svec, Berkshire, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/531,654

(22) Filed: Mar. 21, 2000

(51) Int. Cl.$^7$ .............................................. G06F 13/00
(52) U.S. Cl. ..................................................... 710/107
(58) Field of Search ............................... 710/107, 108, 710/110, 39, 305, 310, 112; 711/3

(56) References Cited

U.S. PATENT DOCUMENTS

| | | | |
|---|---|---|---|
| RE31,977 E | * 8/1985 | Ott ................................ | 711/3 |
| 5,175,537 A | 12/1992 | Jaffe et al. | |
| 5,544,332 A | * 8/1996 | Chen ........................... | 710/108 |
| 5,579,530 A | 11/1996 | Solomon et al. | |
| 5,848,266 A | 12/1998 | Scheurich | |

(List continued on next page.)

FOREIGN PATENT DOCUMENTS

| | | | | |
|---|---|---|---|---|
| JP | PUPA 58-223833 | 12/1983 | ............. | G06F/3/00 |
| JP | PUPA 61-082263 | 4/1986 | ........... | G06F/13/26 |
| JP | PUPA 01-231158 | 9/1989 | ........... | G06F/12/26 |
| JP | PUPA 02-242462 | 9/1990 | ......... | G06F/13/362 |
| JP | PUPA 03-147171 | 6/1991 | ........... | G06F/15/16 |
| JP | PUPA 03-149627 | 6/1991 | ............. | G06F/9/46 |
| JP | PUPA 05-046540 | 2/1993 | ......... | G06F/13/362 |
| JP | PUPA 07-248997 | 9/1995 | ......... | G06F/13/362 |
| JP | PUPA 10-177546 | 6/1998 | ......... | G06F/13/368 |

OTHER PUBLICATIONS

IBM Technical Disclosure Bulletin, vol. 22, No. 2, Jul. 1979, Bus Architecture with Centralized Allocation and Decentralized Simpilified Adaptive Channel Assignment, pp. 863–865.

IBM Technical Disclosure Bulletin, vol. 25, No. 11A, Apr. 1983, Mechanisms for Decentralized Bandwidth Allocation in Inter–Processor Communication Facilities, pp. 5580–5585.

*Primary Examiner*—Khanh Dang
*Assistant Examiner*—Kim T. Huynh
(74) *Attorney, Agent, or Firm*—Schmeiser, Olsen & Watts; William H. Steinberg

(57) ABSTRACT

A method and structure for dynamically blocking access of a request signal R to a shared bus such that R originates from a non real-time master and requests access to an address range of an address space. The shared bus manages requests for access to the address space. The non real-time master and a real-time master compete for access to the address space by presenting address access requests to the shared bus. The dynamic blocking of access by R to the shared bus is accomplished by use of a request limiter, which is a device that is coupled to a real-time clock and uses an algorithm to determine when to enable and disable access of R to the shared bus. The algorithm uses a windowing scheme that permits access of R to the shared bus every $N^{th}$ clock cycle, wherein the value of the integer N may be supplied to the request limiter by the real-time master. An example of the algorithm includes blocking access of R to the shared bus whenever all of the following conditions occur: the real-time master has a non-empty internal queue, the real master and the non real master are both requesting access to a same address range of the address space, and the real-time clock is not at the $N^{th}$ clock cycle that permits access of R to the shared bus.

26 Claims, 1 Drawing Sheet

U.S. PATENT DOCUMENTS

| | | | |
|---|---|---|---|
| 5,887,194 A | * 3/1999 | Carson et al. | 710/36 |
| 5,911,051 A | * 6/1999 | Carson et al. | 710/107 |
| 5,941,967 A | * 8/1999 | Zulian | 710/107 |
| 5,948,089 A | 9/1999 | Wingard et al. | |
| 6,055,577 A | * 4/2000 | Lee et al. | 709/233 |
| 6,105,094 A | * 8/2000 | Lindeman | 710/107 |
| 6,205,524 B1 | * 3/2001 | Ng | 711/151 |
| 6,286,074 B1 | * 9/2001 | Batchelor et al. | 710/305 |
| 6,405,272 B1 | * 6/2002 | Regis | 710/121 |

* cited by examiner

PRE-ARBITRATION REQUEST LIMITER FOR AN INTEGRATED MULTI-MASTER BUS SYSTEM

BACKGROUND OF THE INVENTION

1. Technical Field

The present invention relates to a method and structure for dynamically blocking access of a request signal to a shared bus such that the request originates from a non real-time master and requests access to an address range of an address space.

2. Related Art

With a proliferation of highly integrated system-on-a-chip designs, the shared bus architecture that allows major functional units to communicate is commonly utilized. There are many different shared bus designs which fit into a few distinct topographies. A known approach in shared bus topography is for multiple masters to present requests to an arbiter of the shared bus for accessing an address range of an address space, such as an address space of a given slave device. The arbiter awards bus control to the highest priority request based on a request prioritization algorithm. As an example, a shared bus may include a Processor Local Bus (PLB), wherein the PLB is part a CoreConnect bus architecture of the International Business Machines Corporation (IBM).

The use of an arbiter presents a key problem for a bus architecture in which the arbiter has visibility only to requests when the requests are made and has no knowledge of requests to be made subsequently. With a PLB, for example, the arbitration is done on a request-by-request basis, and requests are honored on the basis of immediate priority according to the prioritization algorithm.

The aforementioned limited visibility of the arbiter presents a critical problem for real-time processing such as the real-time processing of video and audio decoders. Such real-time processing involves sequentially stacked multiple requests by real-time masters (e.g., video and audio decoders) for access to an address range of an address space, in competition with requests to the same address range by non real-time masters such as central processing units (CPUs). The multiple requests are stacked in internal queues of the real-time masters but the status of such internal queues are invisible to the arbiter of the shared bus to which the queued requests will subsequently be presented. Thus a relatively low-priority request originating from a non real-time master (e.g., a CPU) and visible to the arbiter may be granted by the arbiter while a much higher priority request from a real-time master (e.g., a video decoder) may be sitting in the real-time master's internal queue. If such high priority requests from the video decoder are not processed within specified time limits, then an artifact instead of a real image will appear on a video screen. Accordingly, video and audio decoders need to process data on a real-time basis.

Thus, there is a need to limit access of requests from non-real time masters in deference to internally queued requests of real-time masters.

SUMMARY OF THE INVENTION

The present invention provides a digital system, comprising:

a request limiter having a blocking mechanism for blocking access of a request signal to a shared bus, wherein the request signal originates from a blockable master, wherein the request signal requests access by the blockable master to an address range A of an address space, and wherein the shared bus manages requests for access to the address space;

a real-time clock, wherein an instantaneous clock cycle of the real time clock is denoted by a clock cycle index K such that K is a non-negative integer; and an algorithm capable of dynamically enabling and disabling the blocking mechanism, wherein the algorithm is coupled to the clock, wherein the algorithm includes a dependence on K, wherein the algorithm includes a dependence on a variable Q whose value is a function of $Q_1, Q_2, \ldots,$ and $Q_I$, wherein $Q_i$ (i=1, 2, ..., I) denotes an internal queuing state of an $i^{th}$ controlling master $M_i$, and wherein I is a positive integer that denotes a total number of the controlling masters.

The present invention provides a method for dynamically blocking an access of a request signal R to a shared bus such that R originates from a blockable master and requests access to an address range A of an address space, comprising the steps of:

providing the blockable master;

providing the shared bus for managing requests for access to the address space;

providing a real-time clock whose instantaneous clock cycle is denoted by a clock cycle index K such that K is a non-negative integer;

providing I controlling masters denoted as $M_1, M_2, \ldots,$ and $M_I$, wherein I is a positive integer that denotes a total number of the controlling masters, and wherein each $M_i$ (i=1, 2, ..., I) is interfaced with the shared bus such that $M_i$ may transmit a request signal $R_i$ to the shared bus for access to an address range $A_i$ within the address space; and interfacing a request limiter between the blockable master and the shared bus, wherein the request limiter includes a blocking mechanism capable of blocking said access of the request signal R to the shared bus, wherein the blocking mechanism functions in accordance with an algorithm, wherein the algorithm is coupled to the clock, wherein the algorithm includes a dependence on K, wherein the algorithm includes a dependence on a variable Q whose value is a function F of $Q_1, Q_2, \ldots,$ and $Q_I$, and wherein $Q_i$ denotes an internal queuing state of $M_i$ (i=1, 2, ..., I).

The present invention has the advantage of limiting access of requests from non-real time masters in deference to internally queued requests of real-time masters.

DETAILED DESCRIPTION OF THE INVENTION

Figure 1:
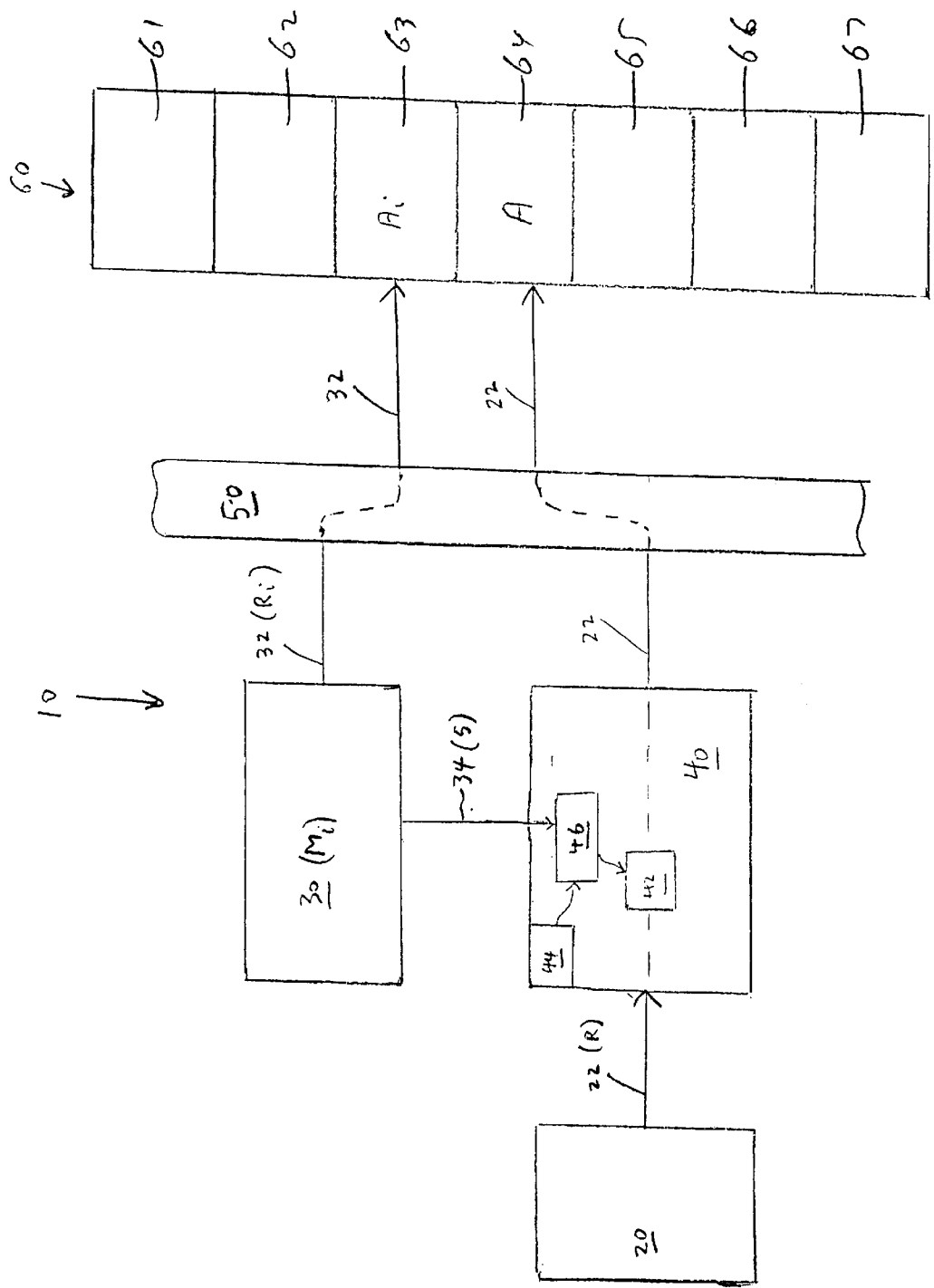
FIG. 1 depicts a digital system, in accordance with preferred embodiments of the present invention.

FIG. 1 illustrates digital system 10, in accordance with preferred embodiments of the present invention. The digital system 10 includes a blockable master 20, a controlling master 30, a request limiter 40, a shared bus 50, and an address space 60.

The address space 60 is subdivided into portions 61, 62, 63, 64, 65, 66, and 67, wherein the aforementioned portions includes address ranges. For example, the portion 64 includes the address range A. A particular address range (i.e., an address range within one of the portions 61, 62, 63, 64, 65, 66, and 67), may constitute an addressable portion of a slave device such as a random access memory (14) device. Access to any address range within the address space 60 may be requested by any master device within the system 10, such as the blockable master 20 or the controlling master 30. Although the system 10 in FIG. 1 includes exactly 7 portions (61, 62, 63, 64, 65, 66, and 67) with corresponding address ranges, the system 10 may generally include L portions, wherein L is any positive integer.

The controlling master 30 represents a master device $M_i$ (i=1, 2, . . . , I) of I controlling master devices. The controlling master 30 is not distinct from $M_i$ but is rather a symbolic representation of the I controlling masters $M_i$ (i=1, 2, . . . , I). The signal 32 originating from the master device $M_i$ includes a request signal $R_i$ for access to an address range $A_i$ associated with a portion 63 of the address space 60. Note that the signal 32 in not limited to a single request signal $R_i$ that is associated with only one value of i, but may include any number of $R_i$'s (i.e., any combination of $R_1, R_2, \ldots, R_I$). $M_i$ is a master device that is able to control a blocking of access (in conjunction with a request limiter 40, and a sideband signal 34 from $M_i$ to an algorithm, as will be described infra) of the blockable master 20 to an address range $B_i$ (i=1, 2, . . . , I) of the address space 60, wherein the address range $B_i$ may be specified or determined by $M_i$. $B_i$ may correspond to any of the portions 61–67 of the address space 60. Such control of blocking of access of the blockable master 20 includes a control of transient blocking, rather than a control of permanent blocking, as will be explained infra. $M_i$ may advantageously control the blocking of access of the blockable master 20 to the same address range $A_i$ to which $M_i$ is itself seeking access through $M_i$'s request signal $R_i$ (i.e., $B_i=A_i$ for i=1, 2, . . . , I). For example, if the address range $A_i$ relates to an SDRAM (synchronous dynamic random access memory) such that $M_i$ seeks access to the SDRAM, then $M_i$ may advantageously control a blocking of access of the blockable master 20 to a SDRAM controller for the address range $A_i$. The aforementioned ability of $M_i$ to control a blocking of access of the blockable master 20 (or of any other blockable master) is particularly important if $M_i$ is, inter alia, a real-time master device such as a video decoder or an audio decoder. As a real-time master device, $M_i$ requires real-time access to $A_i$ with little or no interruption. For example, if the video decoder is unable to satisfy its memory access requirements on a real-time basis, then an artifact instead of a real video image may appear on a video screen that receives signals from the video decoder.

The blockable master 20 is a master device whose signal 22 includes a request signal R for memory access to an address range A within a portion 64 of the address space 60. The ability of the controlling master 30 to control a blocking of access of the blockable master 20 to an address range, such as may be specified by $M_i$ (i=1, 2, . . . , I), may nevertheless be combined with useful features that reduce or minimize restrictions on access by the blockable master 20 to the address range A. For example, a useful feature may be to disable blocking whenever A is unequal to each and every address range $A_i$ (i=1, 2, . . . , I) that $M_i$ is seeking access to, as discussed infra. The blockable master 20 may include, inter alia, a non real-time device (e.g., a central processing unit), which may operate less efficiently if its memory access requests are transiently blocked, but will nonetheless not lose functionality from a delayed access that results from blocking such memory access requests.

The shared bus 50 processes memory access requests, such as memory access requests of the controlling master 30 and the blockable master 20. Thus, the controlling master 30 (i.e., the controlling masters $M_i$, i=1, 2, . . . , I) and the blockable master 20 all use the shared bus 50 to process their respective requests for memory access. In particular, the signal 22 from the blockable master 20, and the signal 32 from the controlling master 30, must present their respective requests to the shared bus 50. In accordance with a prioritization algorithm, the shared bus 50 resolves conflicting requests for memory, such as simultaneous or time-overlapping requests for the same memory address ranges. The shared bus 50 also functions as a conduit for accommodating a flow of data that is associated with a memory access request. As an example, a shared bus may include a Processor Local Bus (PLB), wherein the PLB is part of a CoreConnect bus architecture of the International Business Machines Corporation (IBM).

The request limiter 40 is a device which has a blocking mechanism 42 that is able to block access of the blockable master 20 under control by the any or all of the controlling masters $M_i$ (i=1, 2, . . . , I), wherein the $M_i$ are collectively represented by the controlling master 30. The blocking mechanism 42 may block access of the signal 22 that includes the request signal R for access of the blockable master 20 to the address range A within the portion 64 of the address space 60. Generally, the blocking mechanism 42 is any mechanism known to one of ordinary skill that can block (e.g., prevent or degate) a digital signal from propagating to the digital signal's destination. For example, the blocking mechanism 42 may be physically implemented by an AND gate which functions as a switch that opens or closes a circuit through which the request signal R must propagate in order to reach its destination. When the request signal R is being blocked, R may be held in any possible location. For example, the blocking mechanism 42, when blocking the request signal R, may constrain R to remain in an internal queue of the blockable master 20. As another example, the blocking mechanism 42, when blocking the request signal R, may constrain R to be stored in an internal queue of the request limiter 40.

The request limiter 40 is coupled to the shared bus 50. If the request limiter 40 is electrically coupled to the shared bus 50, then the request limiter 40 is capable of transmitting the signal 22, in the form of an electric current, to the shared bus 50. If the request limiter 40 is optically coupled to the shared bus 50, then the request limiter 40 is capable of transmitting the signal 22, in the form of electromagnetic radiation, to the shared bus 50.

The blocking mechanism 42 of the request limiter 40 functions in accordance with an algorithm 46. The algorithm 46 may be built into a hardware, such as an electronics hardware, of the request limiter 40, but may alternatively be executable from software code, wherein the software code may reside either within the request limiter 40 or be located external to the request limiter 40. If located external to the request limiter 40 , the software code may be recorded on a recordable medium such as on, inter alia, a disk drive, a disk, a magnetic tape, a compact disk, or a memory device (e.g., a RAM device). The algorithm 46 is coupled to the blocking mechanism 42, as illustrated in FIG. 1, and may transiently enable or disable the blocking mechanism 42 based on variables that the algorithm 46 processes. The algorithm 46 is said to enable the blocking mechanism 42 if the algorithm 46 takes explicit action to enable the blocking mechanism 42 or takes no action to disable the blocking mechanism 42 when the blocking mechanism 42 is already enabled. The algorithm 46 is said to disable the blocking mechanism 42 if the algorithm 46 takes explicit action to disable the blocking mechanism 42 or takes no action to enable the blocking mechanism 42 when the blocking mechanism 42 is already disabled.

The algorithm 46 is coupled to a real-time clock 44 and receives input that originates from the clock 44. The algorithm 46 may also receive input from a sideband signal 34 (denoted as S) that originates from the controlling master 30 (i.e., from any combination of $M_i$ (i=1, 2, ..., I). The ability of the controlling master 30 to transmit S to the algorithm 46 couples the controlling master 30 to the request limiter 40 inasmuch as the algorithm 46 is coupled to the blocking mechanism 42 of the request limiter 40 as shown in FIG. 1 and as described supra. The clock 44 may be built into the hardware of the request limiter 40, but may alternatively be located external to the request limiter 40. The clock 44 moves forward in time in discrete units, namely clock cycles. Each clock cycle encompasses a finite time interval and is denoted by a clock cycle index K, wherein K is a non-negative integer. The clock 44 may be a positive clock such that K increases as time moves forward, or a negative clock such that K decreases as time moves forward. The algorithm 46 receives K as input from the clock 44, and the algorithm 46 includes a dependence on K.

The sideband signal 34 originates from the controlling master 30 and provides input to the algorithm 46. The input to the algorithm 46 that exists within the sideband signal 34 may include, inter alia: information concerning an internal queuing state $Q_i$ (i=1, 2, ..., I) of each controlling master $M_i$, address ranges $B_i$ (i=1, 2, ..., I) to which access by the blockable master 20 is to be blocked, and an integer N which determines the clock cycles during which address access blocking may occur. The internal queuing state $Q_i$ includes a status of data to be subsequently transferred between $Q_i$ and a slave device such as random access memory (RAM). Specific ways in which the preceding components of the sideband signal 34 may be utilized by the algorithm 46 will be discussed infra. The sideband signal 34 may be transmitted from the controlling master 30 to the algorithm 46 by any transfer path. For example, the sideband signal 34 may be transmitted directly from the controlling master 30 to the algorithm 46. As another example, the sideband signal 34 may be transmitted from the controlling master 30 to within the request limiter 40 and then to the algorithm 46.

As stated supra, the sideband signal 34 may include information concerning the internal queuing state $Q_i$ (i=1, 2, ..., I) of each controlling master $M_i$ as represented by the controlling master 30. In particular, $Q_i$ may denote, inter alia, an existence of data queued for subsequent transfer from $M_i$ to a slave device (e.g., a memory device such as an SDRAM), or from the slave device to $M_i$. $Q_i$ may additionally include information concerning a number of bits or bytes of data queued for subsequent transfer to or from the slave device. The algorithm 46 may include a dependence on a variable Q which represents any combination or function F of $Q_1, Q_2, \ldots,$ and $Q_I$. The algorithm 46 may receive Q as a component of the sideband signal 34. Alternatively, the algorithm 46 may receive the individual $Q_i$ (i=1, 2, ..., I) from the sideband signal 34, followed by computation by the algorithm 46 of the function F of $Q_1, Q_2, \ldots,$ and $Q_I$. Note that $Q_1, Q_2, \ldots, Q_I$, Q, and F are application dependent and may be defined in any useful manner for a given application. In a particular embodiment, $Q_i$ (i=1, 2, ..., I) may be a binary variable having permissible values of 0 and 1 which respectively denote an empty and non-empty internal queue of $M_i$, wherein Q is a binary variable that is equal to the logical function of $Q_1$ OR $Q_2$ OR ... OR $Q_I$, and wherein the algorithm disables the blocking mechanism 42 whenever Q=0. It is thus pertinent that the shared bus 50, such as a processor local bus (PLB) of a CoreConnect bus architecture of IBM, may have no way of knowing anything about the internal queuing state $Q_i$ of the controlling masters $M_i$. By blocking access of the blockable master 20 whenever any controlling master $M_i$ has data in its queue or has data access requests in it queue, the algorithm 46 compensates for the shared bus 50's lack of knowledge of $Q_i$.

The sideband signal 34 may include the address range $B_i$ (i=1, 2, ..., I) whose access by the blockable master 20 is to be subsequently blocked by the blocking mechanism 42 of the request limiter 40 in conjunction with the algorithm 46. As stated supra, the $B_i$ (i=1, 2, ..., I) may be included within S, which permits the controlling masters $M_i$ to control the blocking access to the address ranges $B_i$ (i=1, 2, ..., I), because S originates from $M_i$, i=1, 2, ..., I. It may be particularly useful for the controlling master $M_i$ to control the blocking of access to an address range $B_i$ during a time frame in which the controlling master $M_i$ itself requires access to $B_i$. The preceding particularly useful control of blocking of access may be implemented by having $B_i=A_i$, wherein $A_i$ is the address range to which $M_i$ is seeking access. As an alternative (or a supplement) to having the $B_i$ included within S, the $B_i$ may be built into the algorithm 46. If built into the algorithm 46, the $B_i$ (i=1, 2, ..., I) could reflect other considerations for denoting the $B_i$ as address ranges to be blocked from access by the controllable master 20, wherein said other considerations are unrelated to dynamic control by $M_i$ of said access to $B_i$.

The algorithm 46 may disable the blocking mechanism 42 whenever A is unequal to each and every of such address range $B_i$ (i=1, 2, ..., I) of the address space 60, wherein A denotes an address range of the address space 60 that the blockable master 20 seeks access to, and wherein the $B_i$ (i=1, 2, ..., I) are the address ranges to be blocked. For the special case of $B_i=A_i$ (i=1, 2, ..., I) as discussed supra, the preceding disablement criterion would have the algorithm 46 disable the blocking mechanism 42 whenever A is unequal to each and every of such address range $A_i$ (i=1, 2, ..., I) of the address space 60. The preceding special case of $B_i=A_i$, together with inclusion of $A_i$ within S, would allow the controlling masters $M_i$ to substantially avoid having their data access requests delayed while nevertheless reducing or minimizing restrictions on access by the blockable master 20 to the address range A. This would circumvent a problem that could exist if a given address range cannot simultaneously accommodate a plurality of data transfer requests.

The algorithm 46 may use a windowing scheme that permits access of R to the shared bus 50 every $N^{th}$ clock cycle, wherein the value of the integer N may be supplied to the request limiter by the sideband signal 34. Thus, the sideband signal 34 may include the integer N which determines the clock cycles during which there may be a blocking of access requests of the blockable master 20. In particular, the algorithm 46 may disable the blocking mechanism every Nth clock cycle of the real-time clock 44; i.e., whenever there is an instantaneous clock cycle K such that K-J is an integer multiple of N on or after a clock cycle J of the clock 44, wherein J denotes a clock cycle during which N becomes known to the algorithm 46. Since the sideband signal 34 can be repeatedly transferred to the algorithm 46 and the contents of the sideband signal 34 can differ for each such transfer, the variables N and J may change as the clock 44 moves forward in time. Note that the preceding integer multiples of N may be negative to accommodate a mode in which the clock 44 counts downward (i.e., the instantaneous clock cycle index K decreases as the clock 44 moves forward in time). Alternatively, the preceding integer multiples of N may be positive to accommodate a mode in which the clock 44 counts upward (i.e., the instantaneous clock cycle index K increases as the clock 44 moves forward in time). As an alternative to having N and J supplied to the algorithm by at least one of the $M_i$ (i=1, 2, . . . , I), N and J may be built into the algorithm 46.

Letting $Q_i$ (i=1, 2, . . . , I) be a binary variable having permissible values of 0 and 1 which respectively denote an empty and non-empty internal queue of $M_i$, the preceding three inputs ($Q_i$, $A_i$, and N) to the algorithm 46 that may exist within the sideband signal 34 could be taken into account by the algorithm 46 as follows: the algorithm 46 enables the blocking mechanism 42 whenever Q=1 wherein Q is a binary variable defined as $Q_1$ OR $Q_2$ OR . . . OR $Q_I$, the instantaneous clock cycle K is such that K-J is not an integral multiple of N on or after the clock cycle J, and wherein A (recalling that A denotes an address range that the blockable master 20 seeks access to) is equal to each address range $A_i$ (i=1, 2, . . . , I) of the address space 60 such that a request originating from $M_i$ requests access to $A_i$. Although not explicitly depicted in FIG. 1, the case of A=$A_i$ is a special case in which the portions 63 and 64 of the address space 60 comprise overlapping address ranges.

While preferred and particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

We claim:

1. A digital system, comprising:
   a request limiter having a blocking mechanism for blocking access of a request signal to a shared bus, wherein the request signal originates from a blockable master, wherein the request signal from the blockable master requests access by the blockable master to an address range A of an address space, and wherein the shared bus manages requests for access to the address space;
   controlling masters denoted as $M_i$ (i=1, 2, . . . , I), wherein I is a positive integer that denotes a total number of the controlling masters, wherein each controlling master is adapted to transmit a request signal to the shared bus, wherein the request signal to the shared bus from each controlling master request access by the controlling master to a portion of the address space, and wherein the request signal from each controlling master transmitted to the shared bus bypasses the request limiter and is not detected or processed by the request limiter;
   a real-time clock, wherein an instantaneous clock cycle of the real time clock is denoted by a clock cycle index K such that K is a non-negative integer; and
   an algorithm capable of dynamically enabling and disabling the blocking mechanism, wherein the algorithm is coupled to the clock, wherein the algorithm includes a dependence on K, and wherein the request signal from each controlling master is not detected or processed by the algorithm.

2. The digital system of claim 1, wherein the algorithm disables the blocking mechanism whenever K-J is an integral multiple of N on or after a clock cycle J, wherein N and J are integers known to the algorithm, and wherein N and J are permitted to change as the clock moves forward in time.

3. The digital system of claim 2, wherein N is supplied to the algorithm by at least one of the $M_i$ (i=1, 2, . . . , I) during the clock cycle J.

4. The digital system of claim 2, wherein N and J are built into the algorithm.

5. The digital system of claim 1, wherein the algorithm disables the blocking mechanism whenever said address range A is unequal to each address range $B_i$ (i=1, 2, . . . , I), of the address space, wherein $M_i$ (i=1, 2, . . . , I) communicates $B_i$ to the algorithm or $B_i$ is built into the algorithm.

6. The digital system of claim 1, wherein the algorithm disables the blocking mechanism whenever said address range A is unequal to each address range $A_i$ (i=1, 2, . . . , I) of the address space such that said request originating from $M_i$ (i=1, 2, . . . , I) requests access to $A_i$.

7. The digital system of claim 1, wherein the algorithm is built into a hardware of the request limiter.

8. The digital system of claim 1, wherein the algorithm is executable from software code.

9. The digital system of claim 8, further comprising a recordable medium, wherein the software code is recorded on the recordable medium.

10. The digital system of claim 1, further comprising the shared bus, wherein the request limiter is coupled to the shared bus.

11. The digital system of claim 10, wherein the shared bus includes a processor local bus (PLB) or a CoreConnect bus architecture of the International Business Machine Corporation.

12. The digital system of claim 1, wherein the algorithm includes a dependence on a variable Q whose value is a function of $Q_1$, $Q_2$, . . . , and $Q_I$, wherein $Q_i$ denotes an internal queuing state of controlling master (i=1, 2, . . . , I).

13. The digital system of claim 12, wherein $Q_i$ (i=1, 2, . . . , I) is a binary variable having permissible values of 0 and 1 which respectively denote an empty and a non-empty internal queue of $M_i$, wherein Q is a binary variable equal to $Q_1$ OR $Q_2$ OR . . . OR $Q_I$, and wherein the algorithm disables the blocking mechanism whenever Q=0.

14. The digital system of claim 13, wherein the algorithm enables the blocking, mechanism whenever Q=1, K-J is not an integral multiple of N on or after a clock cycle J, aid said address range A is equal to at least one address range $A_i$ (i=1, 2, . . . , I) of the address space such that said request originating from $M_i$ requests access to $A_i$, wherein N and J are integers known to the algorithm, and wherein N and J are permitted to change as the clock moves forward in time.

15. A method for dynamically blocking an access of a request signal R to a shared bus such that R originates from a blockable master and requests access to an address range A of an address space, comprising the steps of:
   providing the blockable master;
   providing the shared bus for managing requests for access to the address space;
   providing a real-time clock whose instantaneous clock cycle is denoted by a clock cycle index K such that K is a non-negative integer;
   providing I controlling masters denoted as $M_1$, $M_2$, . . . , and $M_I$, wherein I is a positive integer that denotes a total number of the controlling masters, and wherein each $M_i$ (i=1, 2, . . . , I) is interfaced with the shared bus such that $M_i$ may transmit a request signal $R_i$ to the shared bus for access to an address range $A_i$ within the address space; and
   interfacing a request limiter between the blockable master and the shared bus, wherein the request limiter includes a blocking mechanism capable of blocking said access of the request signal R to the shared bus, wherein the blocking mechanism functions in accordance with an algorithm, wherein the algorithm is coupled to the clock, wherein the algorithm includes a dependence on K, wherein the request signal $R_i$ from each controlling master $M_i$ transmitted to the shared bus bypasses the request limiter and is not detected or processed by the request limiter, and wherein the request signal $R_i$ from each controlling master $M_i$ is not detected or processed by the algorithm (i-1, 2, . . . , I).

16. The method of claim 15, further comprising disabling in accordance with the algorithm the blocking or said access of R to the shared bus whenever K-J is an integral multiple of N on or after a clock cycle J, wherein N and J are integers known to the algorithm, and wherein N and J are permitted to change as the clock moves forward in time.

17. The method of claim 16, further comprising building N and J into the algorithm.

18. The method of claim 15, further comprising disabling in accordance with the algorithm the blocking of said access of R to the shared bus whenever said A is unequal to each address range $B_i$ (i=1, 2, . . . , I) of the address space, wherein $M_i$ (i-1, 2, . . . , I) communicates $B_i$ to the algorithm or $B_i$ is built into the algorithm.

19. The method of claim 15, further comprising disabling in accordance with the algorithm the blocking of said access of R to the shared bus whenever said A is unequal to each said $A_i$ (i=1, 2, . . . , I).

20. The method of claim 15, further comprising building the algorithm into a hardware of the request limiter.

21. The method of claim 15, further comprising executing the algorithm from software code.

22. The method of claim 15, wherein the shared bus includes a processor local bus (PLB) of a CoreConnect bus architecture of the International Business Machines Corporation (IBM).

23. The method of claim 15, wherein the algorithm includes a dependence on a variable Q whose value is a function F of $Q_1$, $Q_2$, . . . , and $Q_I$, and wherein $Q_i$ denotes an internal queuing state of $M_i$ (i=1, 2, . . . , I).

24. The method of claim 23, further comprising:

building N and J into the algorithm;

coupling each $M_i$ (i=1, 2, . . . , I) to the request limiter such that the $M_i$ (i=1, 2, . . . , I) may individually or collectively transmit a sideband signal S to the algorithm, wherein S includes N and a quantity;

selecting the quantity from the group consisting of $Q_1$, $Q_2$, . . . , $Q_I$, combinations thereof, and the function F thereof; and transmitting S to the algorithm, wherein the quantity is communicated to the algorithm, and wherein N is transmitted to the algorithm during the clock cycle J.

25. The method of claim 23, wherein $Q_i$ (i=1, 2, . . . , I) is a binary variable having permissible values of 0 and 1 which respectively denote an empty and a non-empty internal queue of $M_i$, wherein Q is a binary variable equal to $Q_1$ OR $Q_2$ OR . . . OR $Q_I$, and further comprising disabling in accordance with the algorithm the blocking of said access of R to the shared bus whenever Q=0.

26. The method of claim 25, further comprising enabling in accordance with the algorithm the blocking of said access of R to the shared bus whenever Q=1, K-J is not an integral multiple of N on or after a clock cycle J, and A is equal to at least one of said $A_i$ (i-1, 2, . . . , I), wherein N and J are integers knows to the algorithm, and wherein N and J are permitted to change as the clock moves forward in time.

* * * * *